United States Patent
Zhu et al.

(10) Patent No.: US 12,349,013 B2
(45) Date of Patent: Jul. 1, 2025

(54) METHODS AND APPARATUSES FOR BEAM MEASUREMENT

(71) Applicant: Telefonaktiebolaget LM Ericsson (PUBL), Stockholm (SE)

(72) Inventors: Huaisong Zhu, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 676 days.

(21) Appl. No.: 17/607,087

(22) PCT Filed: Apr. 29, 2019

(86) PCT No.: PCT/CN2019/084993
§ 371 (c)(1),
(2) Date: Oct. 28, 2021

(87) PCT Pub. No.: WO2020/220197
PCT Pub. Date: Nov. 5, 2020

(65) Prior Publication Data
US 2022/0232436 A1 Jul. 21, 2022

(51) Int. Cl.
*H04W 36/00* (2009.01)
(52) U.S. Cl.
CPC . *H04W 36/0072* (2013.01); *H04W 36/00835* (2018.08)
(58) Field of Classification Search
CPC .................. H04W 36/0072; H04W 36/00835
See application file for complete search history.

(56) References Cited

U.S. PATENT DOCUMENTS

| | | | | |
|---|---|---|---|---|
| 10,506,464 | B2* | 12/2019 | Chen | H04L 5/0073 |
| 2013/0083774 | A1* | 4/2013 | Son | H04W 36/008357 |
| | | | | 370/331 |
| 2015/0036663 | A1* | 2/2015 | Kilpatrick, II | H04W 36/0085 |
| | | | | 370/332 |
| 2016/0337916 | A1* | 11/2016 | Deenoo | H04W 8/22 |

FOREIGN PATENT DOCUMENTS

| | | |
|---|---|---|
| CN | 108781098 A | 11/2018 |
| WO | 2015 109153 A1 | 7/2015 |
| WO | 2017 039504 A1 | 3/2017 |

(Continued)

OTHER PUBLICATIONS

3GPP TSG-RAN WG2 Meeting #102; Busan, Korea; Source: Samsung; Title: Discussion on Impact of Beam Sweeping on NR RRM Measurement (R2-1808288)—May 21-25, 2018.

(Continued)

*Primary Examiner* — Joseph E Avellino
*Assistant Examiner* — Maryam Emadi
(74) *Attorney, Agent, or Firm* — Sage Patent Group

(57) ABSTRACT

Methods and apparatuses are disclosed for beam measurement. According to an embodiment, a base station obtains a subset of target beams of at least one neighboring base station which is to be measured by a terminal device. The subset is based on historical association between a source beam serving the terminal device and one or more of the target beams. The base station transmits information indicating the subset to the terminal device.

18 Claims, 11 Drawing Sheets

(56) References Cited

FOREIGN PATENT DOCUMENTS

WO        2017 118479 A1      7/2017

OTHER PUBLICATIONS

Extended European Search Report issued for Application No./Patent No. 19927101.6-1212 / 3963942 PCT/CN2019084993—Apr. 4, 2022.
3GPP TSG RAN WG1 Meeting #91; Reno, USA; Source: Huawei, HiSilicon; Title: Remaining issues for codebook subset restriction (R1-1719428)—Nov. 27-Dec. 1, 2017.
3GPP TSG RAN WG1 Meeting #92; Athens, Greece; Source: MediaTek Inc.; Title: Summary 2 on Remaining issues on Beam Failure Recovery (R1-1803441)—Feb. 26-Mar. 2, 2018.
3GPP TSG-RAN WG3 #103bis; Xi'an, China; Source: Ericsson; Title: Successful Handover Report for MRO (R3-191870)—Apr. 8-12, 2019.
PCT Notification of Transmittal of the International Search Report and the Written Opinion of the International Searching Authority, or the Declaration issued for International application No. PCT/CN2019/084993—Jan. 21, 2020.

* cited by examiner

METHODS AND APPARATUSES FOR BEAM MEASUREMENT

PRIORITY

This nonprovisional application is a U.S. National Stage Filing under 35 U.S.C. § 371 of International Patent Application Serial No. PCT/CN2019/084993 filed Apr. 29, 2019 and entitled "Methods and Apparatuses for Beam Measurement" which is hereby incorporated by reference in its entirety.

TECHNICAL FIELD

Embodiments of the disclosure generally relate to wireless communication, and, more particularly, to methods and apparatuses for beam measurement.

BACKGROUND

This section introduces aspects that may facilitate better understanding of the present disclosure. Accordingly, the statements of this section are to be read in this light and are not to be understood as admissions about what is in the prior art or what is not in the prior art.

To meet dramatically increased traffic requirement, one interesting option for the 5th generation (5G) development is to move to new frequency bands which have large amounts of spectrum. Bands of interest may be mm-wave bands of 15-90 GHz along with some bands at frequency range-1 (<6 GHz).

Propagation poses a challenge for mm-wave systems, as it has a more serious free-space propagation loss. Thus, a large antenna-array-based beamforming is a precondition to leverage to mitigate the path-loss. Obstacles and user device's mobility may lead to quick link quality fluctuation at high-frequency radio without a sufficiently fast-adaptive beam-tracking. Hence, a fast beam determination and tracking is necessary at mm-wave bands.

In other sides, higher requirements are put on the 5G systems, i.e. 5G new radio (NR) on mm-wave is still required on its performance in terms of high reliability and low delay. That is to say, besides throughput maximization, robustness is also required for mm-wave radio access network (RAN) of 5G NR.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for beam measurement.

According to a first aspect of the disclosure, there is provided a method implemented at a base station. The method comprises obtaining a subset of target beams of at least one neighboring base station which is to be measured by a terminal device. The subset is based on historical association between a source beam serving the terminal device and one or more of the target beams. The method further comprises transmitting information indicating the subset to the terminal device.

In this way, the burden of beam measurement can be reduced for a terminal device.

In an embodiment of the disclosure, the obtaining the subset comprises determining the subset based on the historical association.

In an embodiment of the disclosure, the method further comprises sending the information indicating the subset to the at least one neighboring base station.

In an embodiment of the disclosure, the subset is determined as at least one target beam whose historical association with the source beam is the highest among the target beams.

In an embodiment of the disclosure, the obtaining the subset comprises sending information indicating the source beam to the at least one neighboring base station or a central control node. The obtaining the subset further comprises receiving the subset from the at least one neighboring base station or the central control node.

In an embodiment of the disclosure, the historical association for a beam pair of the source beam and a target beam is based on an occurrence probability of the beam pair in one or more historical handover events between the base station and the at least one neighboring base station.

In an embodiment of the disclosure, for a historical handover event from the base station to a neighboring base station, a target beam used by the neighboring base station is informed to the base station.

In an embodiment of the disclosure, the occurrence probability of the beam pair is calculated by the base station.

In an embodiment of the disclosure, for a historical handover event from the base station to a neighboring base station, the source beam is informed by the base station to the neighboring base station or a central control node.

In an embodiment of the disclosure, a target beam used by the neighboring base station is informed to the central control node.

In an embodiment of the disclosure, the occurrence probability of the beam pair is calculated by the neighboring base station or the central control node.

In an embodiment of the disclosure, the calculated occurrence probability of the beam pair is informed to the base station.

In an embodiment of the disclosure, for a historical handover event from the base station to a neighboring base station, a target beam used by the neighboring base station is a beam used after beam refinement.

In an embodiment of the disclosure, the subset is to be measured by the terminal device for radio resource management.

In an embodiment of the disclosure, the radio resource management comprises one or more of: link adaptation; load control; inter-cell interference control; and determination of one or more possible handover targets.

According to a second aspect of the disclosure, there is provided a method implemented at a network node. The method comprises receiving, from a first base station, information indicating a source beam of the first base station serving a terminal device. The method further comprises determining a subset of target beams of a second base station which is to be measured by the terminal device, based on historical association between the source beam and one or more of the target beams. The second base station is neighboring to the first base station. The method further comprises sending information indicating the subset to the first base station.

In this way, the burden of beam measurement can be reduced for a terminal device.

In an embodiment of the disclosure, the network node is the second base station or a central control node.

In an embodiment of the disclosure, the subset is determined as at least one target beam whose historical association with the source beam is the highest among the target beams.

In an embodiment of the disclosure, the historical association for a beam pair of the source beam and a target beam is based on an occurrence probability of the beam pair in one or more historical handover events between the first base station and the second base station.

In an embodiment of the disclosure, for a historical handover event from the first base station to the second base station, a target beam used by the second base station is informed to the first base station.

In an embodiment of the disclosure, for a historical handover event from the first base station to the second base station, the network node is informed of the source beam by the first base station.

In an embodiment of the disclosure, the network node is the second base station and a target beam used by the second base station is informed to the central control node.

In an embodiment of the disclosure, the occurrence probability of the beam pair is calculated by the network node.

In an embodiment of the disclosure, the calculated occurrence probability of the beam pair is informed to the first base station.

In an embodiment of the disclosure, for a historical handover event from the first base station to the second base station, a target beam used by the second base station is a beam used after beam refinement.

According to a third aspect of the disclosure, there is provided a base station. The base station comprises at least one processor and at least one memory. The at least one memory contains instructions executable by the at least one processor, whereby the base station is operative to obtain a subset of target beams of at least one neighboring base station which is to be measured by a terminal device. The subset is based on historical association between a source beam serving the terminal device and one or more of the target beams. The base station is further operative to transmit information indicating the subset to the terminal device.

In an embodiment of the disclosure, the base station is operative to perform the method according to the above first aspect.

According to a fourth aspect of the disclosure, there is provided a network node. The network node comprises at least one processor and at least one memory. The at least one memory contains instructions executable by the at least one processor, whereby the network node is operative to receive, from a first base station, information indicating a source beam of the first base station serving a terminal device. The network node is further operative to determine a subset of target beams of a second base station which is to be measured by the terminal device, based on historical association between the source beam and one or more of the target beams. The second base station is neighboring to the first base station. The network node is further operative to send information indicating the subset to the first base station.

In an embodiment of the disclosure, the network node is operative to perform the method according to the above second aspect.

According to a fifth aspect of the disclosure, there is provided a computer program product. The computer program product comprises instructions which when executed by at least one processor, cause the at least one processor to perform the method according to any of the above first and second aspects.

According to a sixth aspect of the disclosure, there is provided a computer readable storage medium. The computer readable storage medium comprises instructions which when executed by at least one processor, cause the at least one processor to perform the method according to any of the above first and second aspects.

According to a seventh aspect of the disclosure, there is provided a base station. The base station comprises an obtaining module for obtaining a subset of target beams of at least one neighboring base station which is to be measured by a terminal device. The subset is based on historical association between a source beam serving the terminal device and one or more of the target beams. The base station further comprises a transmission module for transmitting information indicating the subset to the terminal device.

According to an eighth aspect of the disclosure, there is provided a network node. The network node comprises a reception module for receiving, from a first base station, information indicating a source beam of the first base station serving a terminal device. The network node further comprises a determination module for determining a subset of target beams of a second base station which is to be measured by the terminal device, based on historical association between the source beam and one or more of the target beams. The second base station is neighboring to the first base station. The network node further comprises a sending module for sending information indicating the subset to the first base station.

According to a ninth aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The base station obtains a subset of target beams of at least one neighboring base station which is to be measured by a terminal device. The subset is based on historical association between a source beam serving the terminal device and one or more of the target beams. The base station further transmits information indicating the subset to the terminal device.

In an embodiment of the disclosure, the method further comprises, at the base station, transmitting the user data.

In an embodiment of the disclosure, the user data is provided at the host computer by executing a host application. The method further comprises, at the terminal device, executing a client application associated with the host application.

According to a tenth aspect of the disclosure, there is provided a communication system including a host computer comprising processing circuitry configured to provide user data and a communication interface configured to forward the user data to a cellular network for transmission to a terminal device. The cellular network comprises a base station having a radio interface and processing circuitry. The base station's processing circuitry is configured to obtain a subset of target beams of at least one neighboring base station which is to be measured by a terminal device. The subset is based on historical association between a source beam serving the terminal device and one or more of the target beams. The base station's processing circuitry is configured to transmit information indicating the subset to the terminal device.

In an embodiment of the disclosure, the communication system further includes the base station.

In an embodiment of the disclosure, the communication system further includes the terminal device. The terminal device is configured to communicate with the base station.

In an embodiment of the disclosure, the processing circuitry of the host computer is configured to execute a host application, thereby providing the user data. The terminal device comprises processing circuitry configured to execute a client application associated with the host application.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

3rd generation partnership project (3GPP) NR defines several procedures to support network controlled and terminal assisted handover, especially with massive-multiple input multiple output (MIMO) scenario, which normally includes a plenty of candidate beam pairs in serving and target cells. Network side will configure information about system and synchronization block (SSB) or user equipment (UE) specific channel state information-reference signal (CSI-RS) of target cell(s) when a terminal is attached in the source cell. According to reports of terminal measurements, handover procedure can be triggered and implicitly includes the beam selection procedure for a handover.

Figure 1:
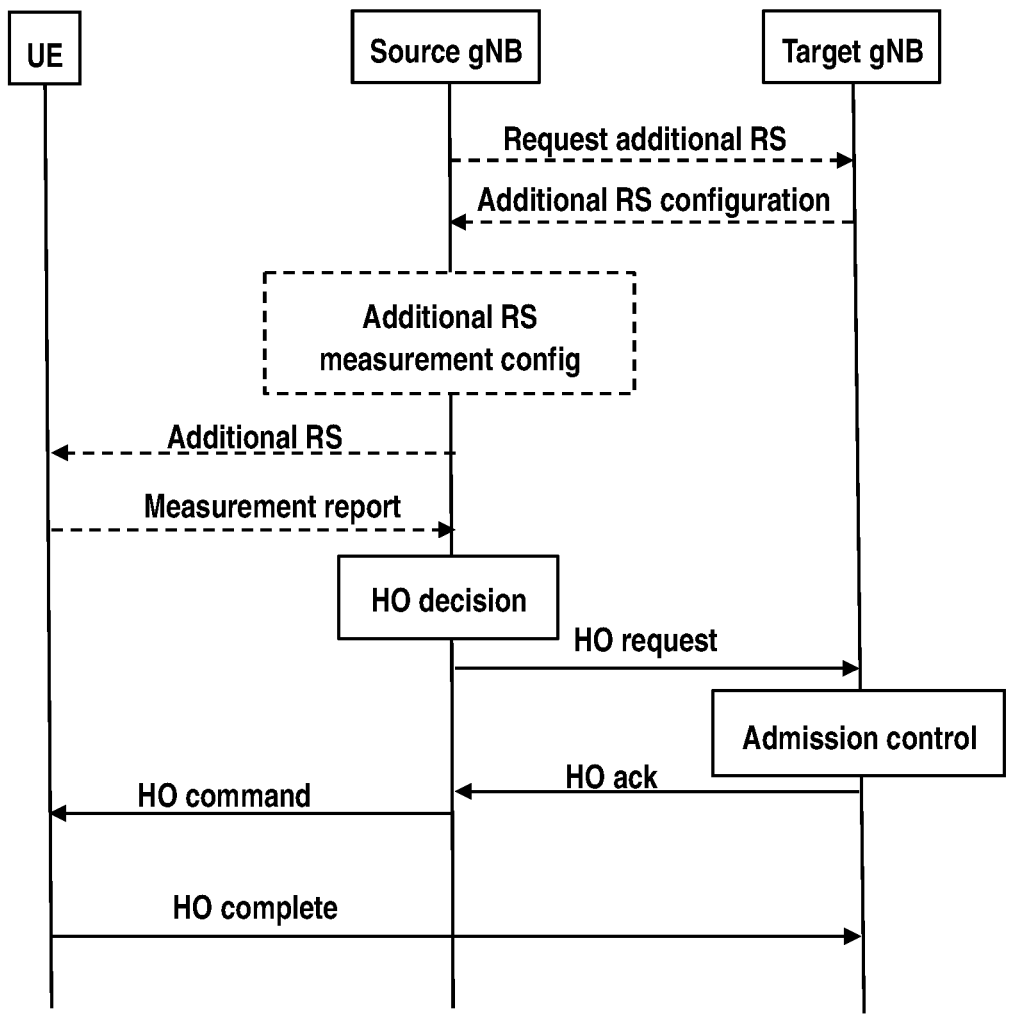
FIG. 1 is a flowchart illustrating the handover procedure in NR.

With respect to SSB based handover, as illustrated in FIG. 1, the source cell will share configuration information on SSB of neighboring cell(s) for a UE to measure and UE measurement results will assist handover procedure to select suitable beam(s) at the target cell. Once the UE has detected a better cell (handover target) or in other word, one or several better SSB of target cell(s), it will report to the serving cell and if the network think handover is necessary (e.g. admission control is allowed in the target cell), the serving cell will inform the UE with access information (e.g., physical random access channel (PRACH) configuration) for the target cell to enable access to the target without reading system information. The access information may include beam specific information such as beam specific PRACH configuration (e.g. mapping from SSB indexes to random access (RA) preambles, mapping from CSI-RS indexes to RA preambles).

For contention free random access (CFRA) based handover, the UE chooses the CFRA resources, if at least one of the SSB beams, for which the CFRA is provided, is above the threshold (this 'threshold', ($T_{RA-SSB}$) is sent in the handover (HO) command). For contention based random access (CBRA) based handover, the UE chooses the CBRA resources, if none of the SSB beams for which the CFRA is provided is above the threshold ($T_{RA-SSB}$).

Another alternative solution for handover is CSI-RS based handover. That is, the source cell will configure UE specific CSI-RS of neighboring cell(s) to the UE, and the UE will measure and report measurement result to assist the network side handover procedure to select suitable beam at the target cell. Different with the SSB based handover, the HO command in CSI-RS based handover specifies CSI-RS resources to RA preamble mapping. The UE will select one of the configured CSI-RSs which is above the configured threshold ($T_{RA-CSIRS}$) and uses the corresponding RA preamble to access the target cell.

In general, with information of selected beam(s) being carried by measurement configuration command, NR can support UEs to start measurement on selected targeted-cell beam(s) before handover. Some selected beam(s) will be aligned with RA preambles correspondingly, and naturally be used in random access procedure for beam management. In principle, there should be a balance between beam optimization and signal/resource overhead.

When neighboring cell is equipped with massive MIMO, which can support many (hundreds of) candidate narrow (fine) beams, to avoid handover failure, the network tends to configure UE to measure narrow-beam of neighboring cell, which can guarantee the PRACH could utilize the best beam pair (UE transmission/reception (TX/RX) beam and cell RX/TX beam) according to the measurement procedure. On the other hand, narrow beam implies UE has to measure too many candidate beams, which in nature causes high terminal measurement load and signaling overhead. So, there should be a balance between measurement load and retainability. A straightforward method to reduce the number of candidate beams for UE to measure is to use a smaller number of "wider" beams (coarse-granularity beams). However, this impairs the beamforming gain as compared to the more desirable "narrow" beams. Hence, it would be desirable to provide a way for selecting a minimum number of best candidate "narrow" beams for UE to have measurements within a limited RS resource and latency. Selecting such most promising "narrow-beam" (fine-granularity beam with a high gain) from a large number of beam sets is not a trivial issue at handover initial steps. But this is critical to mm-wave band radios.

The present disclosure proposes an improved solution for beam measurement. The solution may be applied to a wireless communication system including a terminal device and a base station. The terminal device can communicate through a radio access communication link with the base station. The base station can provide radio access communication links to terminal devices that are within its communication service cell. The base station may be, for example, a gNB in NR. Note that the communications may be performed between the terminal device and the base station according to any suitable communication standards and protocols. The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 2:
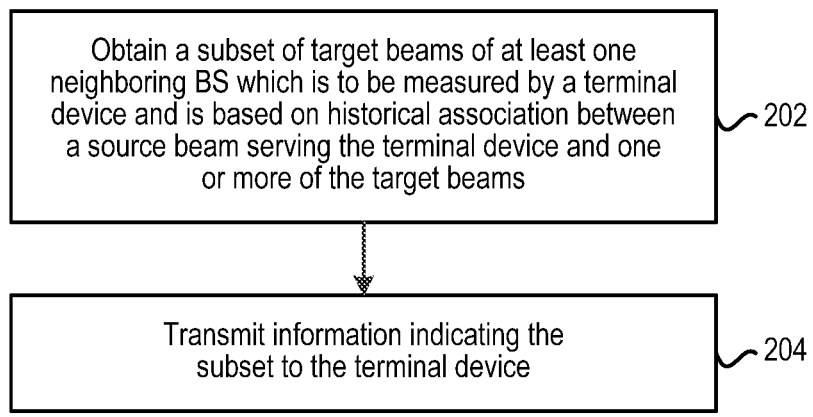
FIG. 2 is a flowchart illustrating a method implemented at a base station according to an embodiment of the disclosure.

Hereinafter, the solution will be described in detail with reference to FIGS. 2-16. FIG. 2 is a flowchart illustrating a method implemented at a base station according to an embodiment of the disclosure. At block 202, the base station obtains a subset of target beams of at least one neighboring base station which is to be measured by a terminal device. The subset is based on historical association between a source beam serving the terminal device and one or more of the target beams. At block 204, the base station transmits information indicating the subset to the terminal device. In this way, since the subset of the target beams is obtained and indicated to the terminal device, the burden of beam measurement can be reduced for the terminal device.

For ease of explanation, a beam transmitted from the base station may be called as a source beam and a beam transmitted from a neighboring base station may be called as a target beam. Note that if there are multiple source beams each of which is serving corresponding terminal device(s), the method of FIG. 2 may be repeated for each of the multiple source beams. Depending on the specific application scenario, it is possible that the number of target beam(s) contained in the subset is smaller than or equal to the total number of the target beams. For example, the subset may be measured by the terminal device for radio resource management (RRM). Examples of the RRM may include, but not limited to, link adaptation, load control, inter-cell interference control (or coordination), and determination of one or more possible handover targets.

For example, the historical association for a beam pair of the source beam and a target beam (e.g. any one of the target beams) may be based on an occurrence probability of the beam pair in one or more historical handover events between the base station and the at least one neighboring base station. A historical handover event may occur from the base station towards a neighboring base station or from a neighboring base station towards the base station. As an exemplary example, for a given source beam, suppose there is one historical handover event occurring from the source beam of the base station towards the i-th target beam of a neighboring base station which have N target beams, where N is an integer greater than 1 and i is an integer belonging to [1, . . . , N]. Then, according to this historical handover event, the occurrence probability of the beam pair, i.e. (the source beam, the i-th target beam) is 100% and the occurrence probability of the beam pair, i.e. (the source beam, any other target beam), is 0%. Suppose there are two historical handover events occurring from the source beam of the base station towards the i-th target beam and the (i+1)-th target beam of the neighboring base station, respectively. Then, according to these two historical handover events, the occurrence probabilities of the beam pairs, i.e. (the source beam, the i-th target beam) and (the source beam, the (i+1)-th target beam) are both 50%. Likewise, for more than two historical handover events, the occurrence probability may be calculated in a similar way.

As a first option, the information about the historical handover event(s) may be collected by the base station and the occurrence probability may be calculated by the base station. In this option, a target beam used by a neighboring base station may be informed to the base station. As a second option, the information about the historical handover event(s) may be collected by a neighboring base station or a central control node. The occurrence probability may be calculated by the neighboring base station or the central control node and informed to the base station. For example, the central control node may be a control node which is a vendor self-defined unit or a standard defined node like radio intelligence controller (RIC) node in O-RAN specification. As a third option, the information about the historical handover event(s) may be collected by a neighboring base station or a central control node. The collected information may be sent to the base station to calculate the occurrence probability at the base station. For the second and third options, the source beam may be informed by the base station to the neighboring base station or the central control node. In the case that the central control node is involved, a target beam used by the neighboring base station may be informed to the central control node. For the first to third options, block 202 may be implemented as block 302 of FIG. 3, which will be described later.

As a fourth option, similar as the second option, the information about the historical handover event(s) may be collected by a neighboring base station or a central control node and the occurrence probability may be calculated by the neighboring base station or the central control node. For this option, block 202 may be implemented as blocks 401-402 of FIG. 4, which will be described later. Optionally, for the above first to fourth options, a target beam used by the neighboring base station may be a beam used after beam refinement. In this way, the association between the source beam and the target beams can be reflected more accurately. The beam refinement means that a relatively wide beam is used by the base station initially due to little information known about a UE, and then the wide beam is changed to a narrow beam when the base station get more and more measurement on the UE and thus knows the UE's position accurately.

Figure 3:
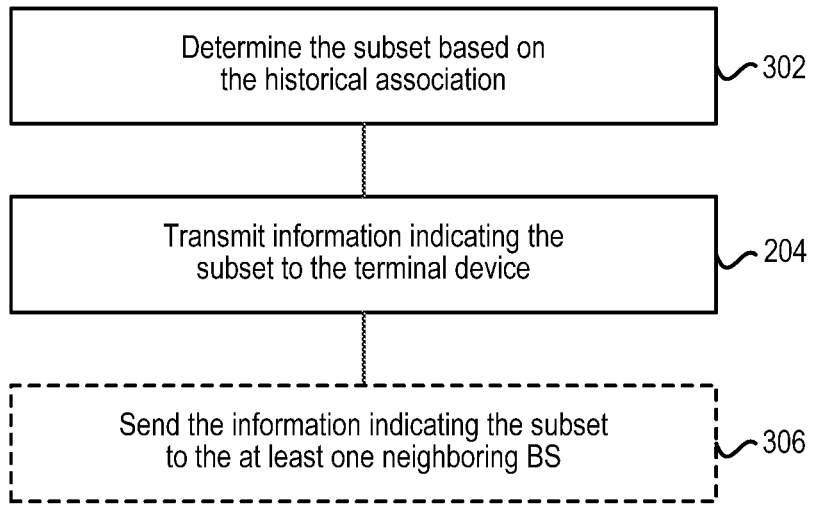
FIG. 3 is a flowchart illustrating a method implemented at a base station according to another embodiment of the disclosure.

FIG. 3 is a flowchart illustrating a method implemented at a base station according to another embodiment of the disclosure. At block 302, the base station determines a subset of target beams of at least one neighboring base station which is to be measured by a terminal device, based on historical association between a source beam serving the terminal device and one or more of the target beams. As described above with respect to block 202, the historical association may be calculated or received by the base station in the first to third options. For example, the subset may be determined as at least one target beam whose historical association with the source beam is the highest among the target beams. The number of the at least one target beam may be depending on the requirement of measurement load or latency.

At block 204, the base station transmits information indicating the subset to the terminal device. The subset may be indicated by various ways. As an example, if the target beam(s) contained in the subset are configured with SSB, the target beam(s) may be indicated by the corresponding SSB indexes. As another example, if the target beam(s) contained in the subset are configured with (e.g. UE specific) reference signal (e.g. CSI-RS), the target beam(s) may be indicated by the corresponding indexes (e.g. CSI-RS indexes). Optionally, in the latter example, the base station may send the information indicating the subset to the at least one neighboring base station at block 306. In this way, the at least one neighboring base station may configure the reference signal on the subset of target beams such that it can be measured by the terminal device.

Figure 4:
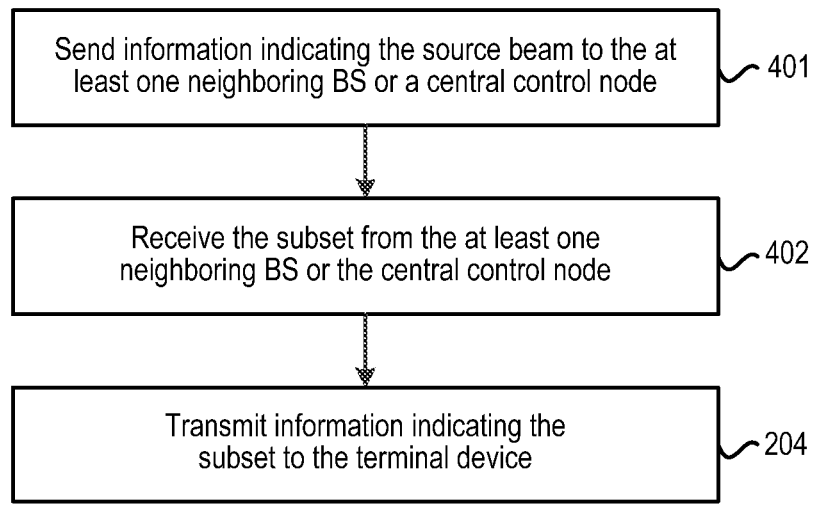
FIG. 4 is a flowchart illustrating a method implemented at a base station according to another embodiment of the disclosure.

FIG. 4 is a flowchart illustrating a method implemented at a base station according to another embodiment of the disclosure. At block 401, the base station sends information indicating a source beam serving a terminal device to at least one neighboring base station or a central control node. In this way, the at least one neighboring base station or the central control node may determine a subset of target beams of the at least one neighboring base station, based on historical association between the source beam and one or more of the target beams. As described above with respect to block 202, the historical association may be calculated by the neighboring base station or the central control node in the fourth option. The subset may be determined in a way similar to block 302. At block 402, the base station receives the subset from the at least one neighboring base station or the central control node. In this way, the subset can be informed to the base station. At block 204, the base station transmits information indicating the subset to the terminal device.

Figure 5:
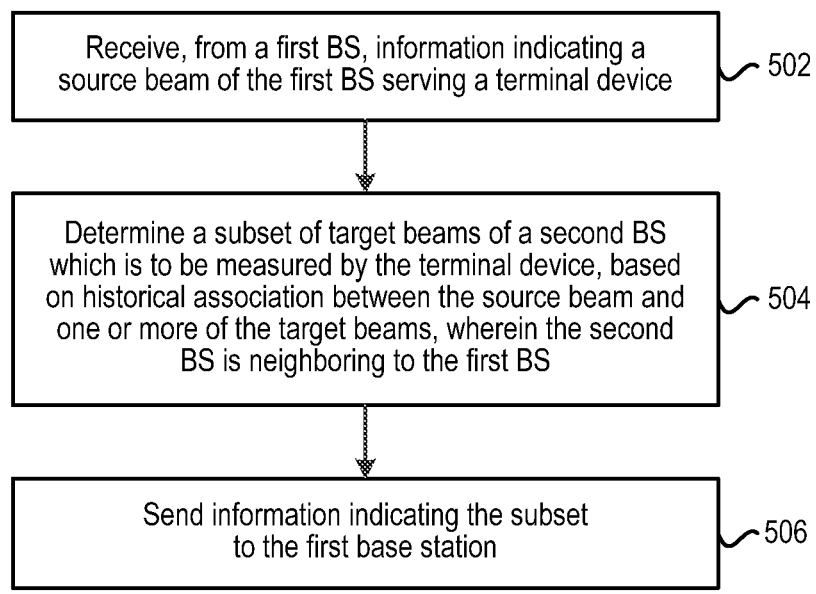
FIG. 5 is a flowchart illustrating a method implemented at a network node according to an embodiment of the disclosure.

FIG. 5 is a flowchart illustrating a method implemented at a network node according to an embodiment of the disclosure. At block 502, the network node receives, from a first base station, information indicating a source beam of the first base station serving a terminal device. The network node may be a second base station that is neighboring to the first base station, or a central control node, which corresponds to the fourth option described above with respect to block 202.

At block 504, the base station determines a subset of target beams of a second base station which is to be measured by the terminal device, based on historical association between the source beam and one or more of the target beams. As described above with respect to block 202, the historical association for a beam pair of the source beam and a target beam may be based on an occurrence probability of the beam pair in one or more historical handover events between the first base station and the second base station. As described above in the fourth option for block 202, in the case that the network node is the second neighboring base station, it may be informed of the source beam by the first base station. In the case that the network node is the central control node, it may be informed of the source beam by the first base station and may be informed of a target beam used by the second base station. In this way, the occurrence probability of the beam pair may be calculated by the network node. Similar to block 302, the subset may be determined as at least one target beam whose historical association with the source beam is the highest among the target beams.

At block 506, the network node sends information indicating the subset to the first base station. Similar to block 204, the subset may be indicated in various ways. As an example, if the target beam(s) contained in the subset are configured with SSB, the target beam(s) may be indicated by the corresponding SSB indexes. As another example, if the target beam(s) contained in the subset are configured with (e.g. UE specific) reference signal (e.g. CSI-RS), the target beam(s) may be indicated by the corresponding indexes (e.g. CSI-RS indexes). Optionally, in the latter example, in the case that the network node is the second base station, it may configure the reference signal on the subset of target beams for measurement by the terminal device. In the case that the network node is the central control node, it may send the information indicating the subset to the second base station such that the second base station may configure the reference signal on the subset of target beams. It should be noted that two blocks shown in succession in the figures may, in fact, be executed substantially concurrently, or the blocks may sometimes be executed in the reverse order, depending upon the functionality involved.

Figure 6:
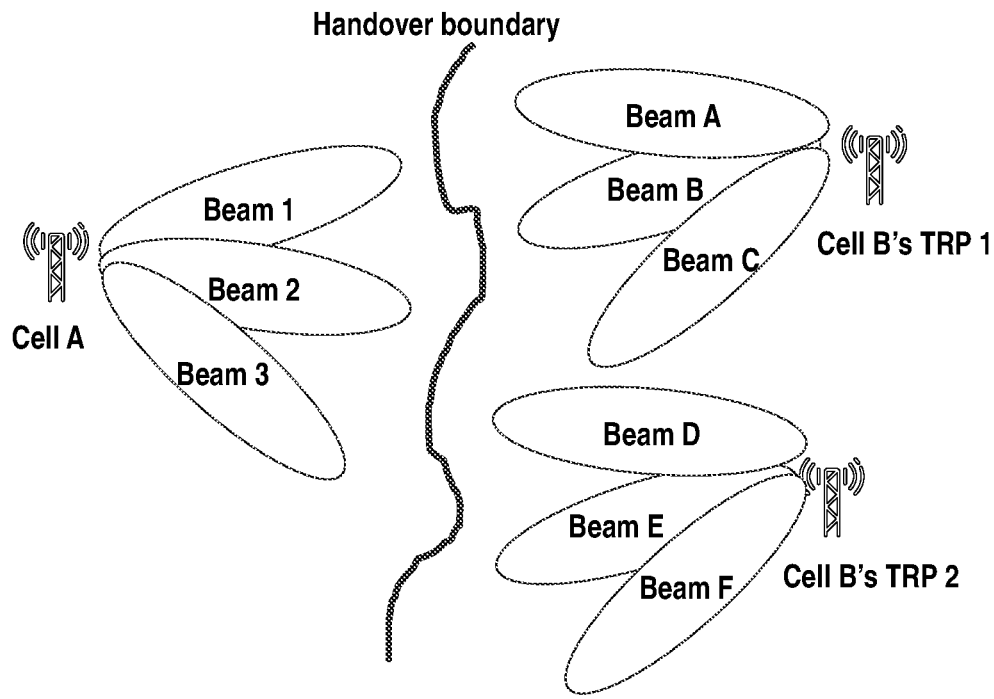
FIG. 6 is a diagram illustrating an exemplary scenario into which an embodiment of the disclosure is applicable.

FIG. 6 is a diagram illustrating an exemplary scenario into which an embodiment of the disclosure is applicable. As shown, in this pre-handover scenario, the source cell is cell A having three source beams, i.e. Beam 1, Beam 2 and Beam 3. The target cell is cell B having 2 transmission reference points (TRPs), i.e. TRP 1 and TRP 2. The TRP 1 has three target beams, i.e. Beam A, Beam B and Beam C. The TRP 2 has three target beams, i.e. Beam D, Beam E and Beam F.

In this embodiment, suppose CSI-RS based handover is employed. Beforehand, in each of regular handover routines (e.g. when the network load is low), the source cell may share its own serving beam information for all the UEs when conducting handovers to the target cells. The target cell may always collect such information to pair with its best serving beam after beam refinement, to form a log of beam-pair at a database. Such database may be shared to all the involving source cells for data-analysis.

Specifically, for each handover, when requesting information, the source cell may send out its own best serving beam for the UE of interest to the target cell. After the UE has successfully handed-over to the target cell, the target cell can get an optimal beam after a beam refinement procedure. The target cell may log such information of best beam pairs of the target cell and the source cell to form a database for all the UEs involving with the handovers. This database may be shared (e.g. from time to time) to the relevant source cells. Either the target cell or the source cell may analyze the relationship between the best source cell beam and the target cell beam (a beam-pair for a UE at handover). Based on the relationship between the beam-pairs, either the source or the target cell may refine the RS information for subsequent measurement for determining possible handover target(s), as described below.

For each of the source-cell beams (call it source-beam A), it may be related with multiple target cell beams, called as target-beam set {A_T}. Then, all the beams in target-beam set {A_T} may be analyzed to get a conditional probability such as p(A_T(i)|A) for each index i (each beam at set {A_T}). According to the obtained probabilities, the best beams may be chosen from set {A_T} to form a short-listed set {A_T_s} according to the requirement of measurement load or latency. Then, the target cell may be informed to configure with {A_T_s} CSI-RS s for the UE to measure and finally select a best one (index k) to report to the source cell. The source cell may inform the target cell of this (index k) at its handover request. In this way, the UE may use its best transmission/receiving beam corresponding to the target cell RX beam k to send its PRACH preamble ("message1"), for instance using the beam correspondence. Correspondingly, the target cell may use RX beam k to receive "message 1".

In the above embodiment, the source cell helps to select most promising target cell beams (corresponding to indexes of SSBs or CSI-RSs) with a confined number so that the UE is enabled to measure them in a shorter duration and determine the best beam and PRACH resource to send its PRACH signals ("message1"). In this way, the source cell can configure/reconfigure proper neighboring cell's candidate beam candidates for UE to measure, by expediting the UE and target cell to have refined beams for its transmission and reception even at initial steps of a handover. This optimized beam-selection for initial handover steps is especially advantageous to mm-wave RAN.

As an exemplary example, based on a database on all collected handover information, the target cell may build up a statistic probability table for best source cell serving beams and target cell serving beams as follows:

|  |  | Target cell Beam # | | | | | |
|---|---|---|---|---|---|---|---|
|  |  | A | B | C | D | E | F |
| Source Cell Beam # | 1 | 40% | 50% | 10% | 0% | 0% | 0% |
|  | 2 | 0% | 60% | 10% | 30% | 0% | 0% |
|  | 3 | 0% | 0% | 10% | 40% | 40% | 10% |

Once the source cell requests RS, it may state which serving beam it is using as a source cell. For example, if the source cell is serving one UE with beam 1, it may be recommended that the target cell will only configure CSI-RSs with beam A and B, for the UE's further measurements, if 2 is a suitable number for configuring CSI-RSs. From this table, the historical logs of source-cell serving beam information can be useful to short-list the candidate beams at target cells for measurement. Thus, at the initial step of handover, the UE can select the optimized beam and both the reference signal resource and measurement latency can be reduced as much as possible.

To enable the above embodiment to work, as one alternative, self-defined XnAP interface may be used to support beam-data sharing. As another alternative, NR XnAP standard (described in 3GPP TS 38.423) may be modified. For both options, the Handover Request message may be updated as well. For example, Beam ID related information may be inserted into this message. One possible message modification is to add the following IE:

```
rsIndexServingCellSEQUENCE{
servingCellSSB-Indexes   ResultsPerSSB-IndexList   OPTIONAL,
servingCellCSI-RS-Indexes   ResultsPerCSI-RS-IndexList   OPTIONAL
}                                           OPTIONAL
```

Figure 7:
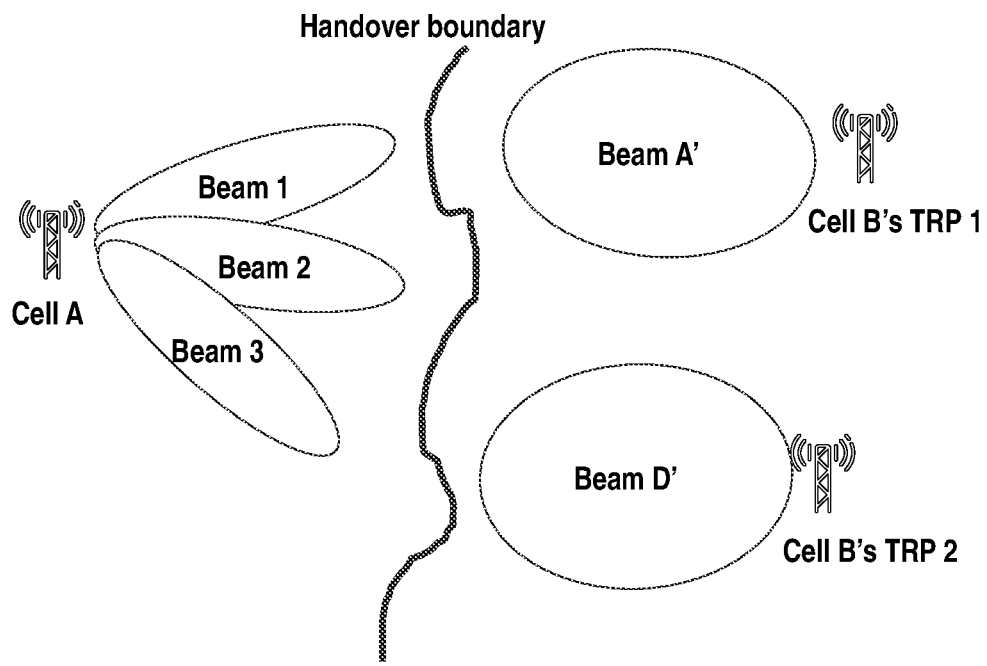
FIG. 7 is a diagram illustrating an existing solution for beam measurement.

FIG. 7 is a diagram illustrating an existing solution for beam measurement. As shown, in this existing NR implementation, to avoid numerous CSI-RS transmission and excessive signaling, the target cell groups numerous narrow traffic beams into a wide beam and equipped each wide beam with a separate CSI-RS (or SSB). This saves CSI-RS resources, but beam optimization is degraded. In contrast, with the embodiment described with reference to FIG. 6, the CSI-RS resources can be saved while beam optimization can be achieved.

Figure 8:
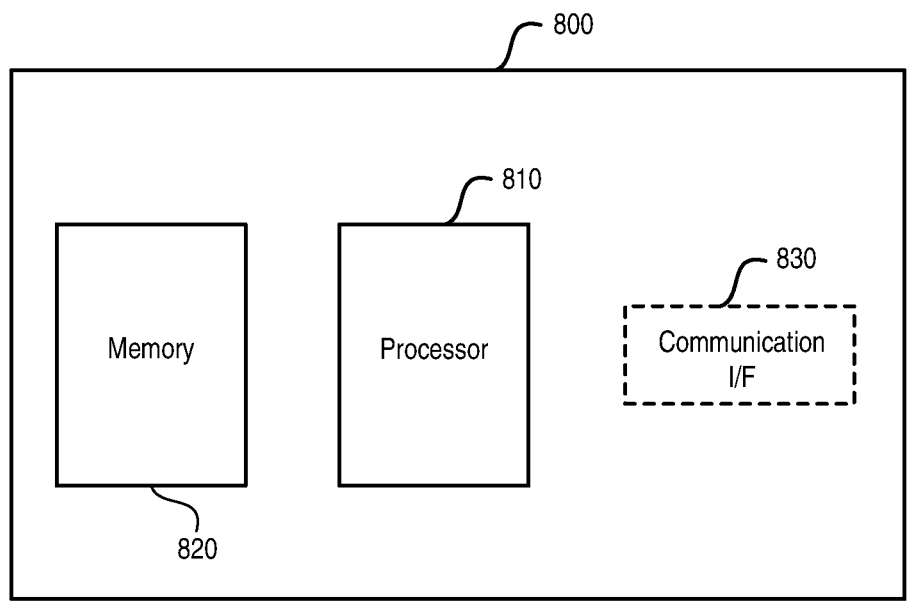
FIG. 8 is a block diagram showing an apparatus suitable for use in practicing some embodiments of the disclosure.

FIG. 8 is a block diagram showing an apparatus suitable for use in practicing some embodiments of the disclosure. For example, any one of the base station and the network node described above may be implemented through the apparatus 800. As shown, the apparatus 800 may include a processor 810, a memory 820 that stores a program, and optionally a communication interface 830 for communicating data with other external devices through wired and/or wireless communication.

The program includes program instructions that, when executed by the processor 810, enable the apparatus 800 to operate in accordance with the embodiments of the present disclosure, as discussed above. That is, the embodiments of the present disclosure may be implemented at least in part by computer software executable by the processor 810, or by hardware, or by a combination of software and hardware.

The memory 820 may be of any type suitable to the local technical environment and may be implemented using any suitable data storage technology, such as semiconductor based memory devices, flash memories, magnetic memory devices and systems, optical memory devices and systems, fixed memories and removable memories. The processor 810 may be of any type suitable to the local technical environment, and may include one or more of general purpose computers, special purpose computers, microprocessors, digital signal processors (DSPs) and processors based on multi-core processor architectures, as non-limiting examples.

Figure 9:
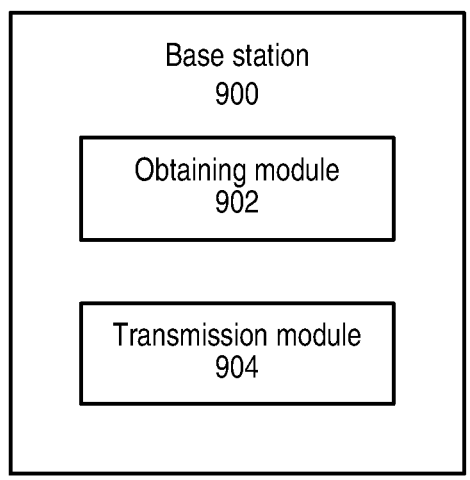
FIG. 9 is a block diagram showing a base station according to an embodiment of the disclosure.

FIG. 9 is a block diagram showing a base station according to an embodiment of the disclosure. As shown, the base station 900 comprises an obtaining module 902 and a transmission module 904. The obtaining module 902 may be configured to obtain a subset of target beams of at least one neighboring base station which is to be measured by a terminal device, as described above with respect to block 202. The subset is based on historical association between a source beam serving the terminal device and one or more of the target beams. The transmission module 904 may be configured to transmit information indicating the subset to the terminal device, as described above with respect to block 204.

Figure 10:
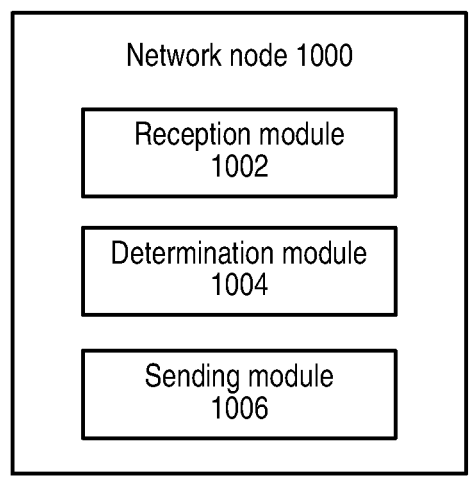
FIG. 10 is a block diagram showing a network node according to an embodiment of the disclosure.

FIG. 10 is a block diagram showing a network node according to an embodiment of the disclosure. As shown, the network node 1000 comprises a reception module 1002, a determination module 1004 and a sending module 1006. The reception module 1002 may be configured to receive, from a first base station, information indicating a source beam of the first base station serving a terminal device, as described above with respect to block 502. The determination module 1004 may be configured to determine a subset of target beams of a second base station which is to be measured by the terminal device, based on historical association between the source beam and one or more of the target beams, as described above with respect to block 504. The second base station is neighboring to the first base station. The sending module 1006 may be configured to send information indicating the subset to the first base station, as described above with respect to block 506. The modules described above may be implemented by hardware, or software, or a combination of both.

Figure 11:
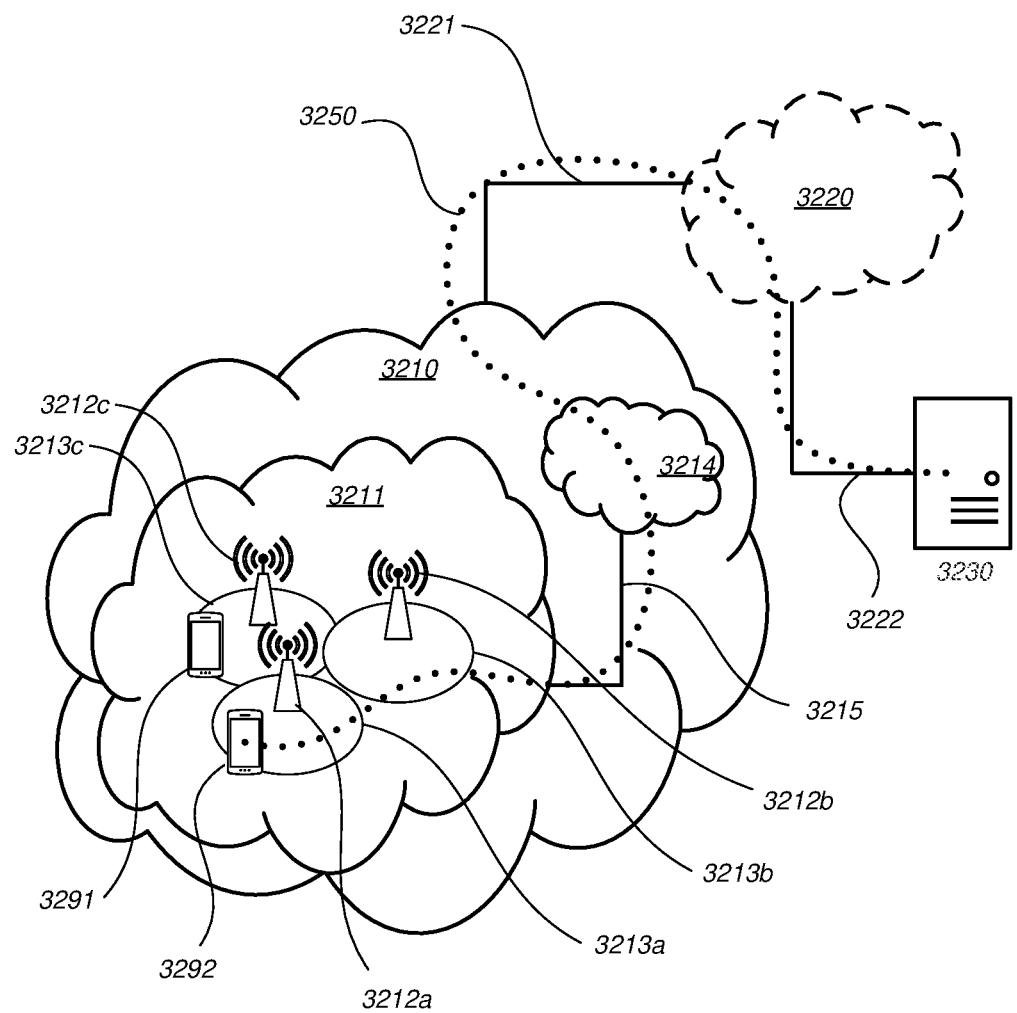
FIG. 11 is a diagram showing a telecommunication network connected via an intermediate network to a host computer in accordance with some embodiments.

With reference to FIG. 11, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 11 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 12. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 12) served by base station 3320. Communication interface 3326 may be configured to facilitate connection 3360 to host computer 3310. Connection 3360 may be direct or it may pass through a core network (not shown in FIG. 12) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 12:
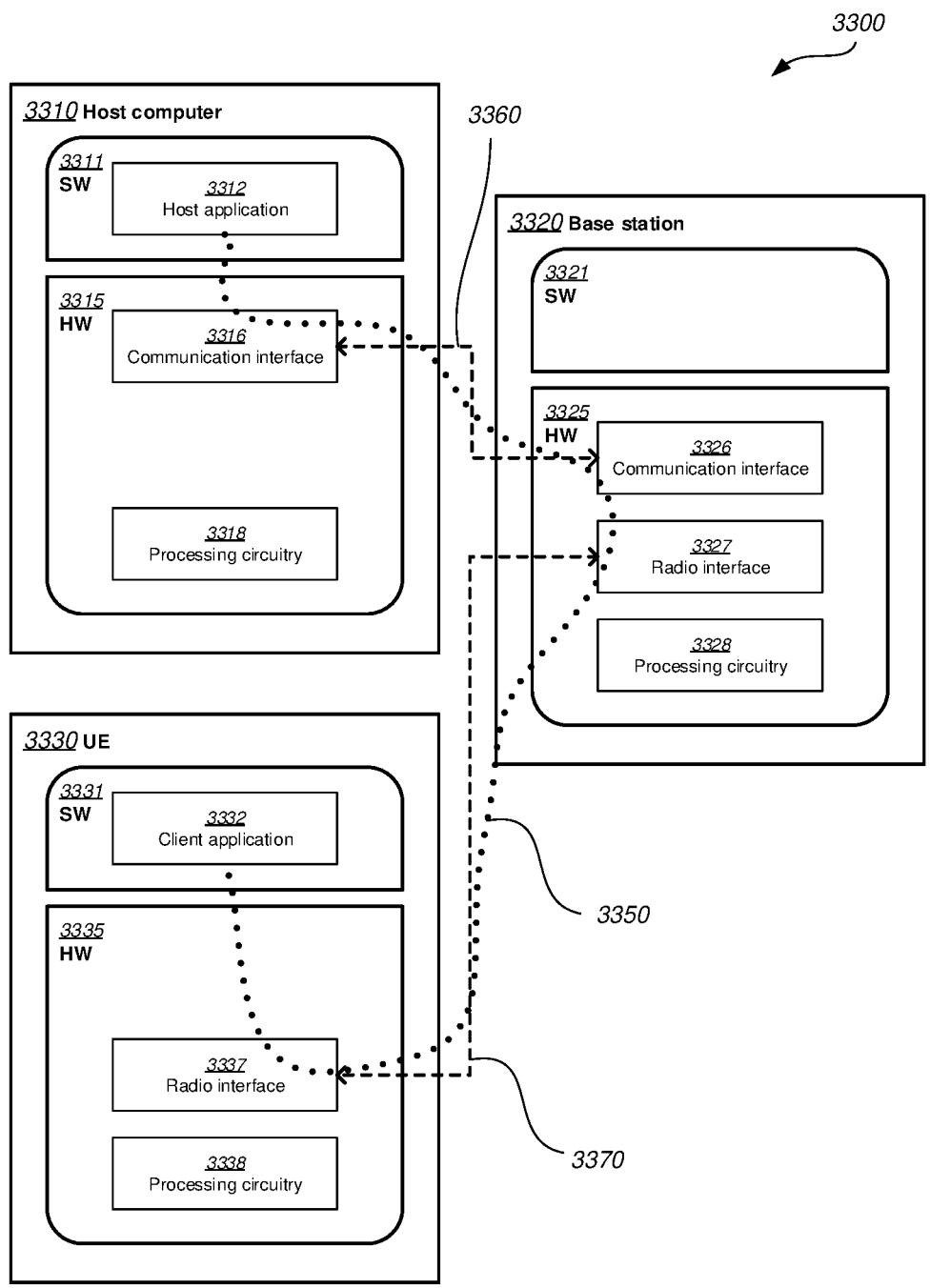
FIG. 12 is a diagram showing a host computer communicating via a base station with a user equipment in accordance with some embodiments.

It is noted that host computer 3310, base station 3320 and UE 3330 illustrated in FIG. 12 may be similar or identical to host computer 3230, one of base stations 3212*a*, 3212*b*, 3212*c* and one of UEs 3291, 3292 of FIG. 11, respectively. This is to say, the inner workings of these entities may be as shown in FIG. 12 and independently, the surrounding network topology may be that of FIG. 11.

In FIG. 12, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 13:
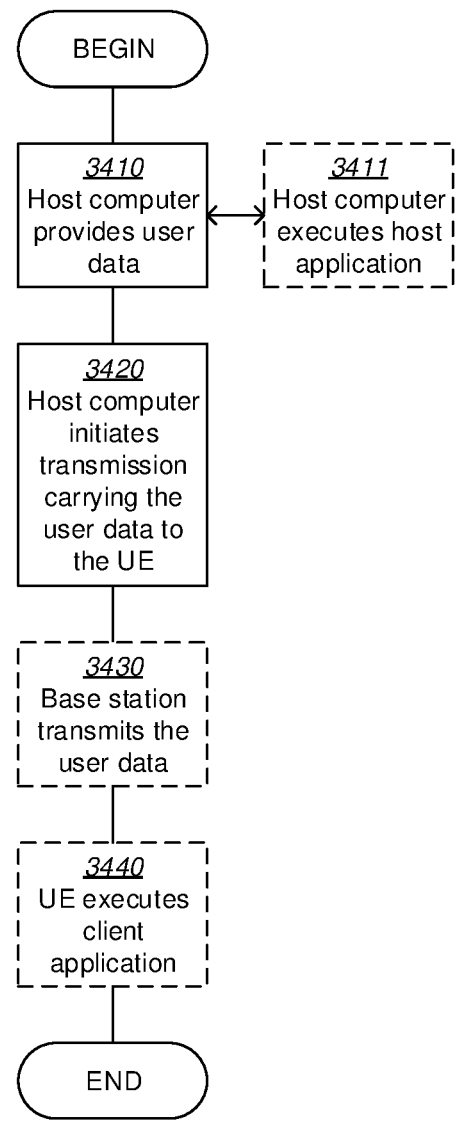
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 14:
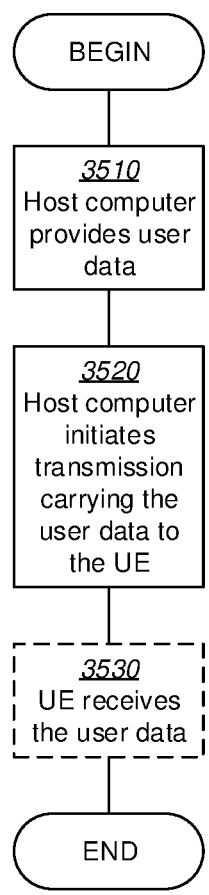
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 15:
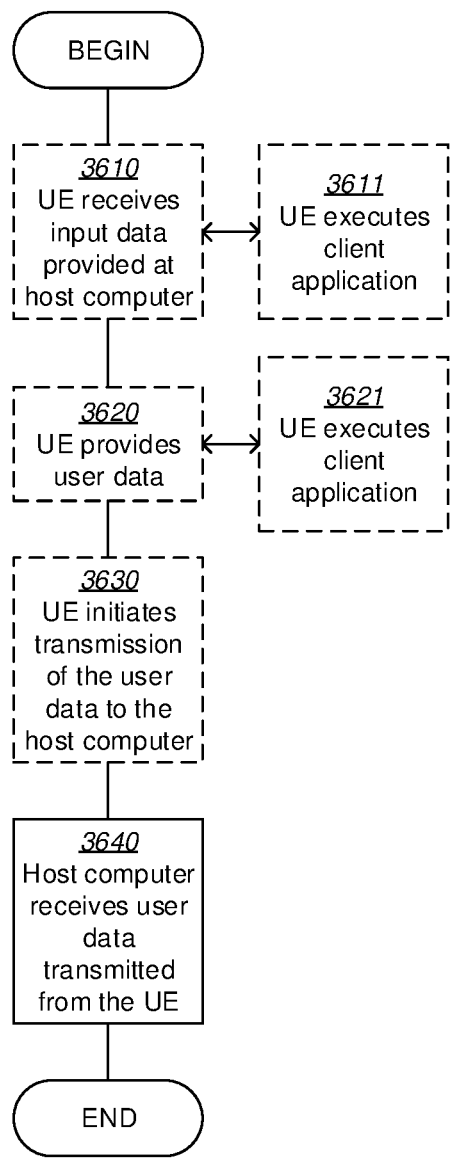
FIG. 15 is a flowchart illustrating a method implemented in a communication system in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 16:
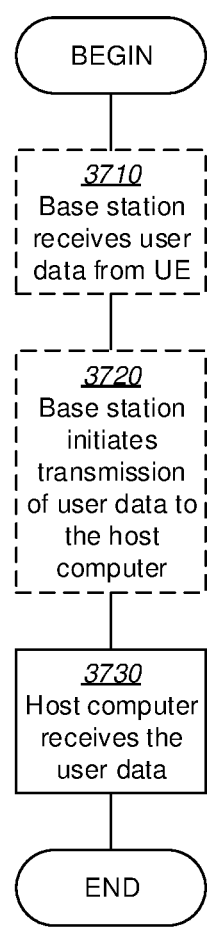
FIG. 16 is a flowchart illustrating a method implemented in a communication system in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method in a base station, the method comprising:
   obtaining a subset of target beams of at least one neighboring base station which is to be measured by a terminal device, wherein the subset is based on historical association between a source beam serving the terminal device and one or more of the target beams; and
   transmitting information indicating the subset to the terminal device, wherein the obtaining the subset comprises:
      determining the subset based on the historical association, and
      sending the information indicating the subset to the at least one neighboring base station, wherein the at least one neighboring base station configures a reference signal on the subset of target beams that is being measured by the terminal device.

2. The method according to claim 1, wherein the subset is determined as at least one target beam whose historical association with the source beam is the highest among the target beams.

3. The method according to claim 1, wherein the obtaining the subset comprises:
   sending information indicating the source beam to the at least one neighboring base station or a central control node; and
   receiving the subset from the at least one neighboring base station or the central control node.

4. The method according to claim 1, wherein the historical association for a beam pair of the source beam and a target beam is based on an occurrence probability of the beam pair in one or more historical handover events between the base station and the at least one neighboring base station.

5. The method according to claim 4, wherein for a historical handover event from the base station to a neighboring base station, a target beam used by the neighboring base station is informed to the base station.

6. The method according to claim 5, wherein the occurrence probability of the beam pair is calculated by the base station.

7. The method according to claim 4, wherein for a historical handover event from the base station to a neighboring base station, the source beam is informed by the base station to the neighboring base station or a central control node.

8. The method according to claim 7, wherein a target beam used by the neighboring base station is informed to the central control node.

9. The method according to claim 7, wherein the occurrence probability of the beam pair is calculated by the neighboring base station or the central control node.

10. The method according to claim 9, wherein the calculated occurrence probability of the beam pair is informed to the base station.

11. The method according to claim 4, wherein for a historical handover event from the base station to a neighboring base station, a target beam used by the neighboring base station is a beam used after beam refinement.

12. The method according to claim 1, wherein the subset is to be measured by the terminal device for radio resource management.

13. The method according to claim 12, wherein the radio resource management comprises one or more of:
   link adaptation;
   load control;
   inter-cell interference control; and
   determination of one or more possible handover targets.

14. A method in a network node, the method comprising:
   receiving, from a first base station, information indicating a source beam of the first base station serving a terminal device;
   determining a subset of target beams of a second base station which is to be measured by the terminal device, based on historical association between the source beam and one or more of the target beams, wherein the second base station is neighboring to the first base station, and wherein the second base station configures a reference signal on the subset of target beams that is being measured by the terminal device; and
   sending information indicating the subset to the first base station.

15. The method according to claim 14, wherein the network node is the second base station or a central control node.

16. The method according to claim 15, wherein the subset is determined as at least one target beam whose historical association with the source beam is the highest among the target beams.

17. The method according to claim 15, wherein the historical association for a beam pair of the source beam and a target beam is based on an occurrence probability of the beam pair in one or more historical handover events between the first base station and the second base station.

18. A base station comprising:
   at least one processor; and
   at least one memory, the at least one memory containing instructions executable by the at least one processor, whereby the base station is operative to:
      obtain a subset of target beams of at least one neighboring base station which is to be measured by a terminal device, wherein the subset is based on historical association between a source beam serving the terminal device and one or more of the target beams; and
   transmit information indicating the subset to the terminal device, wherein the obtaining of the subset comprises:
      determine the subset based on the historical association, and
      send the information indicating the subset to the at least one neighboring base station, wherein the at least one neighboring base station configures a reference signal on the subset of target beams that is being measured by the terminal device.

* * * * *